(12) United States Patent
Chess

(10) Patent No.: US 11,666,835 B2
(45) Date of Patent: Jun. 6, 2023

(54) MULTI-FUNCTION DISTILLER

(71) Applicant: Frederick Jackson Chess, Seattle, WA (US)

(72) Inventor: Frederick Jackson Chess, Seattle, WA (US)

( * ) Notice: Subject to any disclaimer, the term of this patent is extended or adjusted under 35 U.S.C. 154(b) by 0 days.

(21) Appl. No.: 16/826,177

(22) Filed: Mar. 21, 2020

(65) Prior Publication Data

US 2020/0215453 A1    Jul. 9, 2020

Related U.S. Application Data

(63) Continuation of application No. 15/944,177, filed on Apr. 3, 2018, now Pat. No. 10,596,485.

(60) Provisional application No. 62/480,843, filed on Apr. 3, 2017.

(51) Int. Cl.
*B01D 3/38* (2006.01)
*C11B 9/02* (2006.01)
*A23L 27/10* (2016.01)
*B01D 5/00* (2006.01)

(52) U.S. Cl.
CPC ............. *B01D 3/38* (2013.01); *A23L 27/115* (2016.08); *B01D 5/0006* (2013.01); *C11B 9/027* (2013.01)

(58) Field of Classification Search
CPC ....... B01D 3/38; B01D 5/0006; A23L 27/115; C11B 9/027
See application file for complete search history.

(56) References Cited

U.S. PATENT DOCUMENTS

| | | | | |
|---|---|---|---|---|
| 5,338,557 | A * | 8/1994 | Pare | C11B 9/025 426/241 |
| 6,890,424 | B1 * | 5/2005 | Wilde | B01D 11/0219 208/311 |
| 8,092,752 | B2 * | 1/2012 | Davis | B01D 17/042 422/198 |
| 9,272,230 | B2 * | 3/2016 | Myers | C10G 1/042 |
| 2008/0128261 | A1 * | 6/2008 | Balass | B01D 5/006 202/176 |
| 2011/0133120 | A1 * | 6/2011 | McGhee | C11B 9/025 252/182.12 |
| 2014/0001027 | A1 * | 1/2014 | Balass | B01D 11/0296 203/1 |
| 2016/0243460 | A1 * | 8/2016 | Leveson | A61K 36/82 |

* cited by examiner

*Primary Examiner* — Jonathan Miller
(74) *Attorney, Agent, or Firm* — Integral Patent; Lawrence J. Shaw

(57) ABSTRACT

A multi-functional distiller for separating target compounds from a base material. The distiller has a basket, boiling tank, and sealable cap. The basket has at least one selectively sealable port for holding the base material. The boiling tank is adapted for containing a solvent, and the basket is attachable above the solvent. The sealable cap may be removeably attachable to the boiling tank to provide a sealed chamber. The sealable cap can be fitted with multiple condensers. One possible condenser is positionable exterior to the boiling tank and functions to condense vapors produced by the boiling tank. A second such condenser is an inverted condenser which is positionable interior to the tank so as to condense vapors produced by the boiling tank and cause the condensate to drip through the base material.

5 Claims, 2 Drawing Sheets

MULTI-FUNCTION DISTILLER

RELATED APPLICATIONS

The present application is based on and claims priority to non-provisional patent application Ser. No. 15/944,177 filed Apr. 3, 2018 by the same inventor and having the same title as the present application, which in turn is based on and claims priority to provisional patent application Ser. No. 62/480,843 filed Apr. 3, 2017.

TECHNICAL FIELD

A multi-functional distiller which can be used to separate mono terpenes from plant matter. More specifically, a unit that is able to perform a steam distillation of essential oils, a solvent extraction of a solid material, and recover solvents from the solvent extract.

BACKGROUND OF THE INVENTION

Botanical extracts are used in a variety of industries, including food, flavorings, medicine, cosmetics, and several industrial machinery processes such as tire manufacturing. The botanical extraction industry has been growing at an increasing rate in recent years, and as an industry generates approximately $350 billion in global annual dollars. There are two general methods used for botanical extraction: steam distilling and solvent extraction. Steam distilling generally follows the same general steps. To start the process, steam is boiled and then pumped through a container filled with plant matter. The container is typically constructed in such a way that the steam is able to pass through the plant matter contained therein. The steam acts to separate the botanical oils from the plant matter. The light, watery oils known as mono terpenes, or essential oils, are entrained in the steam. The oil infused steam then passes through a condenser. The cooled condenser liquefies the steam infused oil and sends the product to a receiver vessel. Once in the receiver vessel, the oils separate into two distinct classes; those that are water soluble and those that are not. The non-soluble oils float on top of the water, whereas the soluble oils cause the water they are infused in to take on a milky appearance. This water infused with soluble oils is known as hydrosol.

Solvent extractions may be done in a multitude of ways. Prior to solvent extraction, oil seeds are often pressed so as to remove the maximum amount of oil possible. Among the methods of solvent extraction are combinations of heat, pressure, stirring, vacuum, and distilling. One of the most common forms of solvent extraction treats the oil-containing material with a low boiler solvent. When the solvent then begins to boil and treats the oil-containing material, the vapor that results contains a large amount of oil constituents. The extraction unit is capable of capturing this vapor product and condensing it into a liquid. As a preferred solvent will have a much lower boiling point than that of the extract, the solvent is able to re-vaporize and continue the distillation cycle, while the extract remains capture by the unit.

The need for this invention arises from the observation that steam distilling only recovers light oils, while leaving behind other compounds such as resins, fats, alkaloids and chlorophyll. Recovering these compounds requires moving the hot, moist plant material to a solvent extractor for re-extraction. Such a process is neither same nor efficient. Solvent extractions, on the other hand, will generally extract everything, including mono terpenes. However, distilling the solvent back out of the extract results in the mono terpenes distilling off with the solvent and subsequently being lost.

There currently exists a need for a unit that is able to perform the combination of steam distilling and solvent extraction in one system. Such a unit would be able to capture all of the desired botanical products, while eliminating the risk of losing any excess mono terpenes or damaging any product during transportation between units.

SUMMARY OF THE INVENTION

An apparatus that is able to perform steam distillation of plant material that results in the capturing of mono terpenes, or essential oils. The apparatus is further able to be adapted to perform a solvent extraction process so as to capture all of the other constituents contained in the botanical. A solvent recovery distillation is then able to be performed for removing any solvent from the resulting extract.

A botanical distillation and extraction apparatus comprising: a main boiling chamber, a basket for holding plant matter, a heating system, an optional vacuum system, and two distinctly unique condensers which may be interchanged according to the desired process.

BRIEF DESCRIPTION OF THE DRAWINGS

The accompanying drawings in the following description illustrate various exemplary embodiments of the present disclosure. It is understood that a person of ordinary skill in the art may derive other embodiments from these drawings which fall within the scope of the disclosure set forth herein.

DETAILED DESCRIPTION

Figure 1:
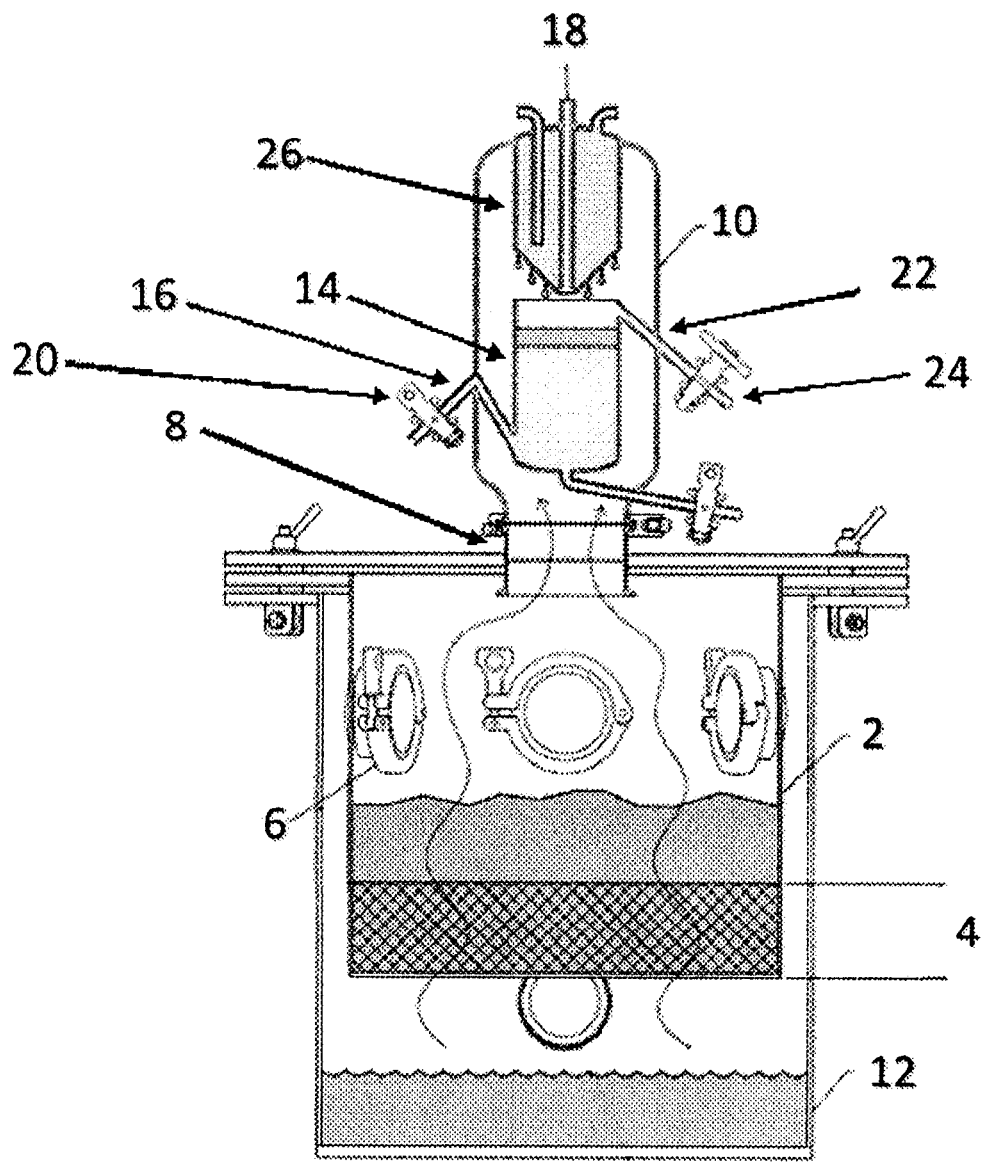
FIG. 1 is an embodiment of the apparatus equipped with the proper condenser to be used for either steam or solvent distillation.

With reference to FIG. 1, plant material is placed in a basket 2. The basket 2 is placed inside of a distillation unit. The basket 2 may be in the shape of a rectangle, square, circle, ellipsis, or any other shape that allows for the basket 2 to adequately retain plant material for the purposes of distillation. According to one embodiment, the basket 2 may contain any number of perforations 4. The perforations 4 allow liquid or vapor to pass through the faces of the basket 2 unopposed. The perforations 4 may be located on any number of the faces of the basket 2. This may include the top, bottom, or any sides of the basket 2. According to one embodiment, the perforations 4 are arranged in a square-like grid pattern. According to another embodiment, the perforations 4 are arranged in a series of diamonds. The perforations 4 may be arranged according to any pattern known by those skilled in the art to allow for the proper unopposed passage of liquid or vapor through the perforations 4.

According to one embodiment, the bottom of the basket 2 is perforated. According to another embodiment, the perforations 4 may run up the side of the basket 2. The perforations 4 may cover any portion of the basket 2 that still allows for a liquid or vapor to pass through the basket 2. According to another embodiment, the perforations 4 run 4" up the side of the basket 2.

With continued reference to FIG. 1, the apparatus may contain any number of selectively sealable ports 6. The ports 6 may be located on any of the surfaces of the apparatus.

According to one embodiment, the ports 6 are located in the side of the basket 2. The ports 6 may be configured at the top of the basket 2 so that when open, solvent vapor is able to enter the interior of the basket 2 and liquefy on the condenser. The ports 6 are of a construction that allows them to be fully sealed from the outside atmosphere during either a distillation process or a solvent extraction. The ports 6 may be manufactured from any material known in the art to create a functioning seal for such purposes. The ports 6 may be opened to the atmosphere when the apparatus is not running an operation. The ports 6 may be operated by a flange, O-ring, gasket, or any other type of sealing mechanism known by those skilled in the art.

According to one embodiment, plant material may be stacked in the basket 2 so as to at least fill the basket 2 above the top of the perforations 4. According to another embodiment, the plant material is at most stacked to the bottom edge of the solvent vapor ports 6.

With continued reference to FIG. 1, the cap 8 of the distiller may be fitted with flanges. The flanges may be located on either the inside or outside of the center opening used for attachment purposes of the condensers. According to one embodiment, the steam distilling process uses a Pyrex glass condenser 10. According to another embodiment, the Pyrex glass condenser 10 contains a Coldfinger style condenser 26 located at the top of the Pyrex glass condenser 10. The Pyrex glass condenser 10 is attached to the top of the cap 8. The basket 2 of plant material is placed in the boiling tank 12. Water is then added to the boiling tank 12 until the desired water level is reached. According to one embodiment, the desired water level is just below the bottom of the basket 2. According to another embodiment, the desired water level is calculated according to a desired ratio of water to plant material. The cap 8 may be secured to the condenser by way of swing bolt closures, or any other means of securement. The water located in the boiling tank 12 is then brought to a boil.

With continued reference to FIG. 1, the steam generated from the boiling water penetrates the plant material. The steam passes through the plant material, separating and gathering oils as it passes through. The oil-infused steam then rises to the top of the boiling tank 12. After arriving at the top of the boiling tank 12, the oil-infused steam then reaches the Pyrex glass condenser 10. The oil-infused steam liquefies on the Pyrex glass condenser 10, causing the resultant liquid product to begin "dripping". The dripping liquid is captured in a catch basin 14 (also referred to as a "separatory funnel"), which is suspended beneath the Pyrex glass condenser 10. According to one embodiment, the catch basin 14 is a cup. The catch basin 14 may be larger than the Pyrex glass condenser 10 so as to ensure that all of the liquid product is captured during the dripping phase.

With continued reference to FIG. 1, the catch basin 14 contains an angled 5 joint 16. The angled joint 16 allows liquid to exit the catch basin 14. The angled joint 16 is positioned at such an angle so as to allow liquid to drain from the bottom of the catch basin 14, but only when the liquid level in the catch basin 14 is above the level of the angled joint 16. The angled joint 16 may be placed on any face of the catch basin 14. According to one embodiment, the angled joint 16 is affixed with a drain valve 20 for cutting off the flow exiting the angled joint 16. The means for cutting off flow from the angled joint 16 may be by way of a drain valve, a plug, or any other means known by those skilled in the art.

With continued reference to FIG. 1, the oil begins to build up on the surface of the water inside the catch basin 14. According to one embodiment, the angled joint 16 is placed at such a height along the side of the catch basin 14 so that the rate at which liquid drains from the catch basin 14 through the angled joint 16 matches that of the rate at which liquid flows off of the Pyrex glass condenser 10 and into the catch basin 14. The oil collection method allows for creating steam vapor with lightly simmering water, which in turn acts to protect delicate flower essences within the oils from thermal degradation.

According to one embodiment, the system may be operated at lower pressures. According to another embodiment, the system may be run under vacuum. A vacuum pump 18 may be attached to the Pyrex glass condenser 10 in order to lower the pressure of the system. According to one embodiment, the vacuum pump is located at the top of the Pyrex glass condenser 10. Operating the system at a lower pressure causes the boiling point of the water to be lowered, which allows for the creation of steam at lower temperatures.

With continued reference to FIG. 1, when oil stops building up in the catch basin 14, the drain valve 20 may be closed. The closing of the drain valve 20 allows the catch basin 14 to fill up with distilled water. The level of distilled water will then continue to rise until the level begins to reach the top of the catch basin 14. A second angled joint 22 is located near the top portion of the catch basin 14. According to one embodiment, the second angled joint 22 is positioned so as to allow the liquid located at the top of the catch basin 14 to begin flowing out of the catch basin 14 at such a time when the liquid level rises above the second angled joint 22.

With continued reference to FIG. 1, the second angled joint 22 is affixed 10 with a drain valve 24 for cutting off the flow exiting the second angled joint 22. The means for cutting off flow from the second angled joint 22 may be by way of a drain valve, a plug, or any other means known by those skilled in the art. Once the distilled water has reached a sufficient level so as to allow all of the desired oil product to flow through the second angled joint 22 and be captured, the drain valve 24 affixed to the second angled joint 22 may be closed.

Figure 2:
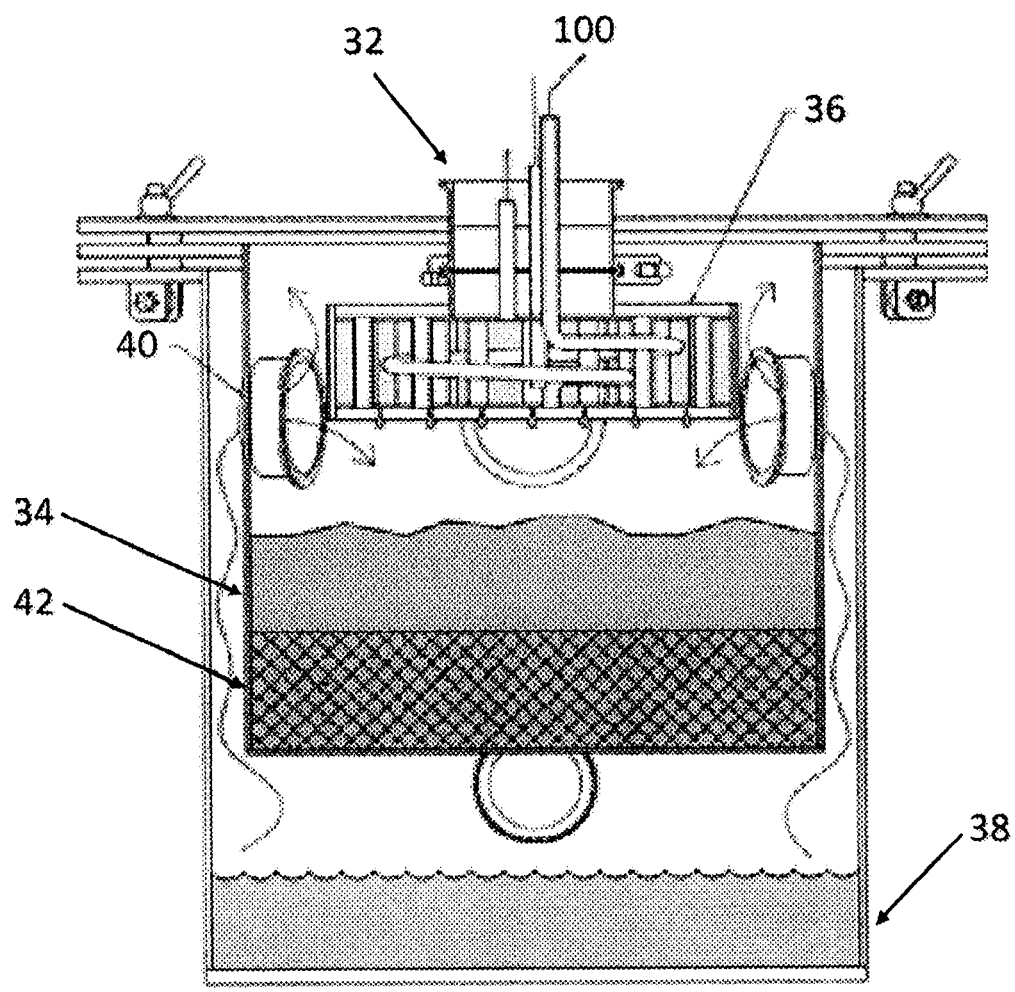
FIG. 2 is an embodiment of the apparatus equipped with the proper condenser to be used for solvent extraction.

With reference to FIG. 2, the Pyrex glass condenser is removed from the top of the cap 32. An inverted condenser 100 is then attached to the underside of the cap 32 in place of the Pyrex glass condenser. The cap 32 hangs over the basket 34 which contains the plant material. The basket 34 may be in the shape of a rectangle, square, circle, ellipsis, or any other shape that allows for the basket 34 to adequately retain plant material for the purposes of organic solvent extraction.

According to one embodiment, the inverted condenser 100 is designed to be cylindrical in shape. The inverted condenser 100 may be designed so as to have a diameter slightly less than the diameter of the basket 34. Multiple tubes 36 run from the exterior of the top of the inverted condenser 100 to the exterior of the bottom of the inverted condenser 100. According to one embodiment, the inverted condenser 100 has multiple tubes running from the exterior of one vertical side of the inverted condenser 100 to the exterior of the opposing side of the inverted condenser 100. According to another embodiment, the inverted condenser 100 has tubes running from the exterior of the top of the inverted condenser 100 to the exterior of the bottom of the inverted condenser 100, and tubes running from the exterior of one vertical side of the inverted condenser 100 to the exterior of the opposing side of the inverted condenser 100.

With continued reference to FIG. 2, an organic solvent is poured through the plant material. According to one embodiment, the organic solvent is an alcohol, such as ethanol. The organic solvent is added to the unit in such an amount so as to at least cover the bottom portion of the boiler tank 38. According to one embodiment, the organic solvent is added until it is between about two to about three inches deep in the boiler tank 38. The cap 32 is fitted into place and secured. Cooling fluid may then be flushed through the inverted condenser 100 to control the temperature of the unit. According to one embodiment, the temperature maintained in the inverted condenser 100 is between 45°-65° F. (7.2°-18.3° C.). Heat is then applied to the boiler tank 38 so as to bring the organic solvent to a boil.

With continued reference to FIG. 2, the combination of heating the boiler tank 38 and cooling the inverted condenser 100 commences a distillation cycle in which the organic solvent begins to vaporize. The caps covering the ports 40 on the basket 34 are removed and the basket 34 is left in place in the boiler tank 38. The vapors of the organic solvent enter through the ports 40 in the upper sides of the basket 34. The vapors then begin to liquefy on the inverted condenser 100. The liquefied organic solvent then drips from the inverted condenser 100 on to the plant material below.

According to one embodiment, organic solvent distillate collects on the top of the inverted condenser 100. According to another embodiment, organic solvent distillate also collects on the inside of the tubes 36. This allows for liquefied organic solvent to flow down the tubes 36 and "rain" evenly across the top of the basket 34. According to another embodiment, liquefied organic solvent also flows off the sides of the inverted condenser 100. The combination of solvent flow parameters allows for an even extraction of the botanical.

With continued reference to FIG. 2, as the liquefied organic solvent is "raining" down onto the plant material, organic solvent vapor is directly penetrating the plant material in the basket 34. According to one embodiment, the penetration of the organic solvent vapor creates a unique condition in which organic solvent vapor and liquefied organic solvent are working independently and simultaneously to perform the extraction of the botanical.

With continued reference to FIG. 2, the unit may be placed under vacuum to lower the boiling point of the solvent. According to one embodiment, low temperature extraction of the botanical may be desired.

With continued reference to FIG. 2, as the plant material begins to become saturated with the organic solvent, the organic solvent begins to strip soluble constituents from the botanical. The extracted saturated organic solvent then begins to drip through the perforations 42 in the bottom of the basket 34. The basket 34 may contain any number of perforations 42. The perforations 42 allow liquid or vapor to pass through the faces of the basket 34 unopposed. The perforations 42 may be located on any number of the faces of the basket 34. This may include the top, bottom, or any sides of the basket 34.

According to one embodiment, the extract has a boiling point which is higher than that of the organic solvent. This discrepancy in boiling points allows for the extract to remain in the bottom of the boiler tank 38 while the organic solvent continues to revaporize. The continued re-vaporization of the organic solvent causes the gas to rise back to the inverted condenser 100. According to one embodiment, this cycle is allowed to repeat for a specified period of time. According to another embodiment, the cycle is allowed to repeat until such a time when the organic solvent is deemed to have fulfilled its purpose for extraction. This may be by way of deeming that the plant material no longer contains any useful botanicals, or any other signs known by those skilled in the art for indicating the completion of an extraction cycle.

According to one embodiment, upon completion of the extraction cycle, the operator may pour off the extract saturated organic solvent and store it for another purpose. According to another embodiment, the operator could use the unit to distill the organic solvent out of the extract.

With continued reference to FIG. 2, the basket of plant material is removed from the boiler tank 38. The inverted condenser 100 is then removed from the cap 32.

Referring now back to FIG. 1, the Pyrex glass condenser 10 is reinstalled on the top of the cap 8. According to one embodiment, the Pyrex glass condenser 10 contains a Coldfinger style condenser 26 located at the top of the Pyrex glass condenser 10.

With continued reference to FIG. 1, a distillation cycle is then commenced. According to one embodiment, organic solvent begins to vaporize out of the extract. The organic solvent then begins to subsequently liquefy on the Coldfinger style condenser 26. Condensed organic solvent is then able to flow into a collecting unit.

According to one embodiment, the collecting unit is the catch basin 14 that is used to collect the essential oils from the previous distillation. According to another embodiment, the collecting unit is a structure of similar kind to that of the catch basin 14, however the previously obtained essential oils are not located in the collecting unit. According to another embodiment, the collecting unit is of any shape, size, and material that allows for the safe and efficient capture of the condensed organic solvent, as known by those skilled in the art.

According to one embodiment, the condensed organic solvent drains out of the bottom outlet of the catch basin 14 and into another collecting unit located outside of the distillation unit. According to one embodiment, the entirety of the organic solvent may be removed from the extract. According to another embodiment, this process may be used to only remove a portion of the organic solvent from the extract.

With continued reference to FIG. 1, if a complete purge of organic solvent is desired, the extract may be placed in a separate container after the majority of the organic solvent has been removed through the above process. According to one embodiment, the separate container is a bowl. The basket 2 may then be placed back in the boiler tank 12 and the bowl placed inside the basket 2. According to one embodiment, the unit is supplied with heat to dilute the extract to the desired concentration of organic solvent. According to another embodiment, the unit is placed in a vacuum and then supplied with heat to dilute the extract to the desired concentration of organic solvent. The extract is thus not subjected to direct contact with the heated sides and bottom of the distiller, protecting the extract from any thermal degradation associated with such.

The distillation unit also may be used as a vacuum oven for purging and drying extracts. Vacuum ovens have a heating source, a rack to hold the material that is to be dried and the capability of handling a deep vacuum from a vacuum pump. The present distillation unit satisfies off of these criteria as in includes a perforated basket that holds plant material and also serves as the rack to hold a tray or bowl of material to be purged and dried.

What is claimed is:

1. A multi-functional apparatus for separating target compound from a base material, comprising:

a basket for the holding of the base material, the basket containing at least one selectively sealable port;

a boiling tank for containing a solvent in which the basket may be attached;

a sealable cap removeably attachable to the boiling tank to provide a sealed chamber, said sealable cap being capable of being fitted with multiple condensers, and said multiple condensers, a first one of said multiple condensers being attachable to said cap and positionable exterior to said boiling tank to condense vapors produced by said boiling tank, a second one of said multiple condensers being an inverted condenser attachable to said cap and positionable interior to said boiling tank to condense vapors produced by said boiling tank and cause the condensate to drip onto said base material.

2. The apparatus of claim 1 wherein the basket for holding the base materials contains perforations through which vapor from said boiling tank can access the base material, and through which said solvent can flow out of said basket.

3. The apparatus of claim 1 further comprising a vacuum pump in communication with the sealed chamber to lower a boiling point of said solvent.

4. The apparatus of claim 3 wherein said vacuum pump provides a vaccum in the boiling tank and the boiling tank is further used as a vacuum oven for purging said solvent from said target compound.

5. The apparatus of claim 1 wherein use of said first one of said multiple condensers is for the purpose of steam distillation, and wherein use of said second one of said multiple condensers is for the purpose of solvent extraction.

* * * * *